(12) United States Patent
Ballard et al.

(10) Patent No.: US 8,035,911 B2
(45) Date of Patent: Oct. 11, 2011

(54) CARTRIDGE DRIVE DIAGNOSTIC TOOLS

(75) Inventors: Curtis C. Ballard, Ft. Collins, CO (US); Stanley S. Feather, Ft. Collins, CO (US); Steven Maddocks, Ft. Collins, CO (US); John G. McCarthy, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1265 days.

(21) Appl. No.: 11/707,722

(22) Filed: Feb. 15, 2007

(65) Prior Publication Data

US 2008/0198489 A1   Aug. 21, 2008

(51) Int. Cl.
*G11B 15/18* (2006.01)
(52) U.S. Cl. ............................ 360/69; 360/31; 369/30.32
(58) Field of Classification Search ........................ None
See application file for complete search history.

(56) References Cited

U.S. PATENT DOCUMENTS

| | | | |
|---|---|---|---|
| 5,926,341 A | 7/1999 | Mueller | |
| 6,028,733 A | 2/2000 | Schmidtke | |
| 6,421,306 B1 | 7/2002 | Luffel | |
| 7,085,884 B2 * | 8/2006 | Torrey et al. | 711/115 |
| 7,206,151 B2 * | 4/2007 | Kimura et al. | 360/53 |
| 7,280,293 B2 * | 10/2007 | Nylander-Hill et al. | 360/31 |
| 7,289,292 B2 * | 10/2007 | Kotaki et al. | 360/92.1 |
| 7,318,116 B2 * | 1/2008 | Gallo et al. | 711/100 |
| 7,484,040 B2 * | 1/2009 | Deicke et al. | 711/115 |
| 7,676,445 B2 * | 3/2010 | Fry et al. | 706/52 |
| 2002/0049923 A1 * | 4/2002 | Kanazawa et al. | 714/5 |
| 2005/0229020 A1 * | 10/2005 | Goodman et al. | 714/2 |
| 2006/0085595 A1 * | 4/2006 | Slater | 711/114 |
| 2006/0126211 A1 * | 6/2006 | Sasaki | 360/74.4 |

* cited by examiner

*Primary Examiner* — Jason Olson

(57) ABSTRACT

In one embodiment, a method of diagnosing an error in a cartridge drive, comprises detecting an occurrence of a defined event in a cartridge drive, in response to the defined event, initiating an analysis routine of at least one event log from the cartridge drive, and invoking an intervention routine when the analysis indicates that the defined event represents a failure threat.

20 Claims, 3 Drawing Sheets

CARTRIDGE DRIVE DIAGNOSTIC TOOLS

BACKGROUND

The described subject matter relates to electronic computing, and more particularly to cartridge drive diagnostic tools.

Storage automation systems, e.g., data cartridge storage systems, typically include a host computer and a data storage device. The data storage device typically comprises a cartridge storage element, input/output components, and a moveable cartridge access component, sometimes referred to as a "picker." The cartridge storage element stores a plurality of data cartridges in an array, and each data cartridge in the array has an associated storage position within the cartridge storage element.

During operation, the data storage device may receive, from the host computer, a request for retrieval of a specified data cartridge. The storage device determines, based on the request received from the host computer, a data cartridge position for the requested data cartridge. The movable cartridge access device then moves to that position, retrieves the requested cartridge from the cartridge storage element, moves to the position of an input/output component, for example, a data cartridge drive, and loads the data cartridge into the data cartridge drive.

Moreover, the data storage device may also receive, from the host computer, a request to return a previously retrieved data cartridge to the storage element. The storage device determines, based on such a request, to return received from the host computer, a data cartridge position for storing the foregoing data cartridge. The movable cartridge access device then retrieves the data cartridge from the input/output component, moves the data cartridge to the determined data cartridge location and loads the data cartridge into the cartridge storage element.

Typically, the data storage device further comprises a controller, which is configured to receive requests, such as the cartridge retrieval requests described above, from the host computer and manage the operation of the device in response to the requests. During operation of the storage device, the controller may retain operational information that is used by the controller for operation and management of the device. A data storage device may also comprise a separate management controller which is configured to receive requests such as, e.g., configuration settings or cartridge retrieval requests from a management computer or a person at a management console.

Cartridge drive performance issues frequently begin as minor performance issues with the drive or the tape media. Recovery algorithms in the drive may permit the drive to recover from minor performance issues in a way that is not visible to users or administrators of the storage system. Thus, the performance issues may remain invisible until a failure occurs in the drive or media. Such failures may cause the storage system to experience downtime and may consume administrative resources to fix the drive and/or media.

DETAILED DESCRIPTION

Figure 1:
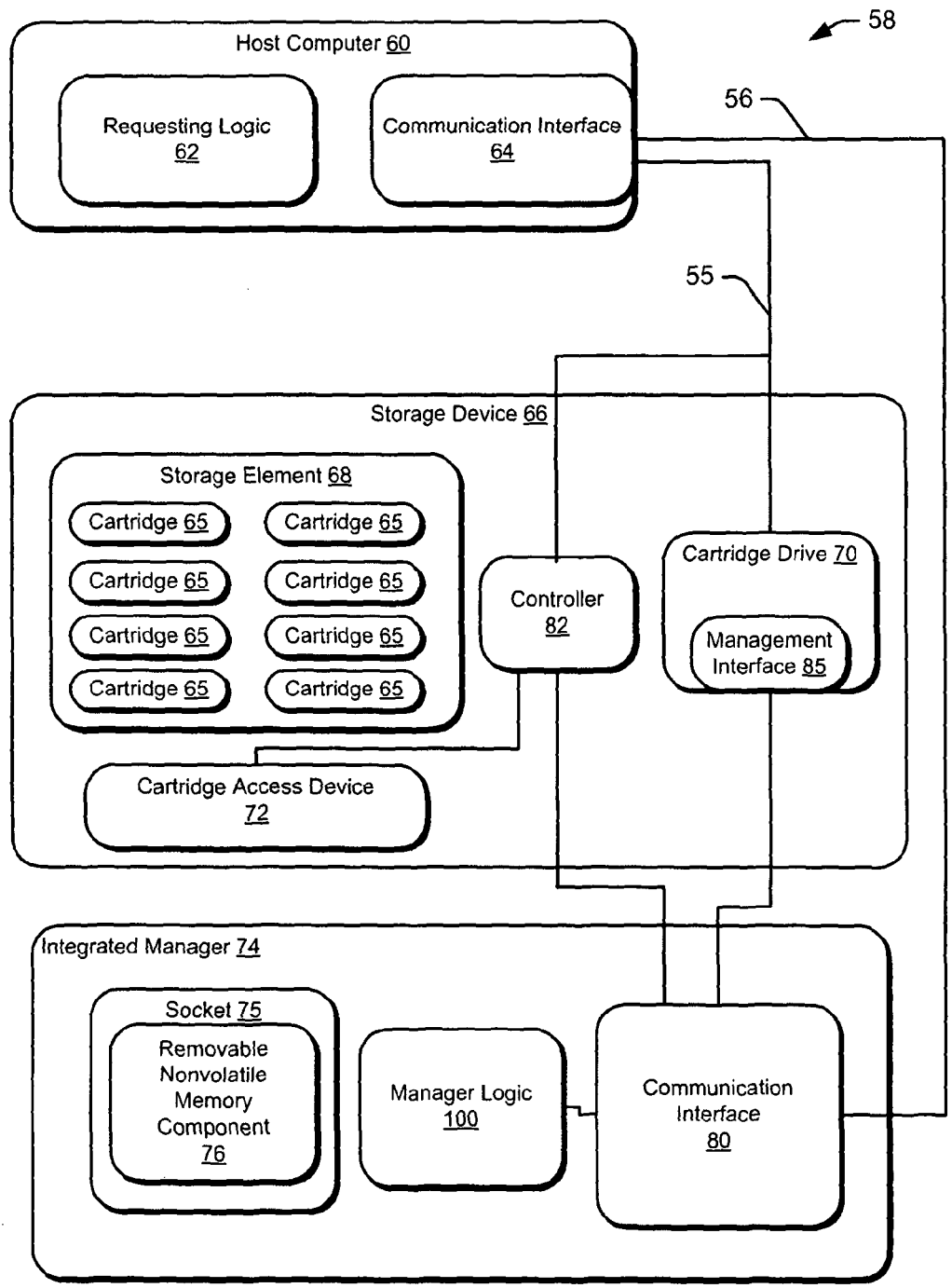
FIG. 1 is a schematic illustration of an exemplary embodiment of a cartridge library.

Described herein are exemplary tape library architectures, and diagnostic methods for anticipating and/or managing errors in a cartridge drive. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

In exemplary embodiments, the architectures and methods may be implemented in tape storage libraries such as the tape storage libraries described in U.S. Pat. No. 5,926,341; 6,028,733; or 6,421,306, commonly assigned to the assignee of the present application, the disclosures of which are incorporated by reference herein in their entirety.

A cartridge in accordance with various exemplary embodiments of the present invention can comprise a data cartridge, such as, for example, a tape cartridge, compact disc read only memory (e.g., CD-ROM), or diskette. In addition, cartridges can comprise containers, such as vials for storing substances, or other known or future-developed devices. Moreover, an embodiment of a cartridge storage system that stores and transports data cartridges will be described in more detail hereafter with reference to FIG. 1 and FIG. 2. However, it should be noted that, in other embodiments, the cartridge storage system may store and transport other types of cartridges.

A cartridge storage system in accordance with one embodiment of the present invention may comprise a removable nonvolatile memory component (RNMC). When the system is functioning properly, operational data is stored in the RNMC. "Operational data" generally refers to data that can subsequently be used to recover an operational state or provide a descriptive history of the cartridge storage system when a component of the system malfunctions. Note that operational data may further comprise information germane to the current state of the data storage system as well as historical information that may be used to evaluate performance of the system to detect past errors or predict future errors.

As mere examples, the RNMC can be used to store operational data indicative of the identification number of various hardware components, system errors or other operational events and/or other operational data that may be used in device recovery, maintenance, or evaluation. For example, the RNMC may be used to store copies of software components that can be loaded at reboot, to store warranty information associated with one or more components of the storage device, and/or to update software upgrades of system components, as will be described in more detail hereafter. Furthermore, in the event that the cartridge storage system malfunctions or in the event of an unexpected power outage or surge, the operational data that is stored in the RNMC is retained and can then be used during system recovery.

Moreover, if the RNMC resides on or is integrated with a failed component of the cartridge storage system, the RNMC can be removed from the failed component, which can then be replaced with an operational component. Further, the RNMC can be positioned on the operational component thereby allowing the failed component to be replaced without losing the operation data stored in the RNMC.

As an example, the RNMC may be mounted on a printed circuit board (PCB) along with a system controller that controls various components of the cartridge storage system. If the system controller fails, the PCB may be removed and replaced with a new PCB having a new system controller that is operational. The RNMC may be removed from the PCB of the failed system controller and mounted on the new PCB such that the components of the cartridge storage system, including the operational controller of the new PCB, have access to the operational data stored in the RNMC.

FIG. 1 is a schematic illustration of an exemplary embodiment of a cartridge library. Referring to FIG. 1, the system 58 comprises a storage device 66 which may be coupled to a host computer 60 via suitable communication connection 56 for communicating therebetween. The storage device 66 comprises a storage element 68 for storing one or more data cartridges 65. In addition, the storage device 66 can comprise a cartridge receiver, for example a cartridge drive 70, that receives data cartridges from the storage element 68. Further, the host computer 60 may interface to the cartridge drive 70 via connection 55 thereby allowing access to data stored on cartridges 65 that are loaded into the cartridge drive 70. Cartridge drive 70 further includes a management interface 85 that provides an interface to management operations of the cartridge drive 70. Storage device 66 further includes a controller 82, which is coupled to host computer 60 via a suitable communication interface and to cartridge access device 72 by another suitable communication interface.

In this regard, when the host computer 60 needs access to a cartridge 65 residing in the storage element 68, the host computer 60 requests retrieval of the specific cartridge 65. The request may be transmitted to the controller 82 via connection 55 In response, the controller 82 instructs a movable cartridge access device 72, sometimes referred to as a "picker," to retrieve the requested cartridge 65 and load the cartridge 65 into the cartridge drive 70. The host computer 60 may then access the data contained on the cartridge 65 currently loaded in the cartridge drive 70.

The storage device 66 further comprises an integrated manager 74 for configuring and monitoring the storage device 66. The integrated manager 74 preferably comprises a communication interface 80, a socket 75, and manager logic 100. An RNMC 76 is situated within the socket 75, which provides a conductive connection between the RNMC 76 and other components of the integrated manager 74. The RNMC 76 is utilized to store operational data associated with the storage system 58. For example, during a cartridge request and load, process errors may occur. Such errors may include mechanical failures, for example a loading device may malfunction, or software errors. When an error occurs, information for recovery of the storage device 66 is preferably stored to the RNMC 76. As an example, data stored to the RNMC 76 may comprise information describing the position of the various mechanical components (e.g., the movable cartridge access device 72) at the point of failure of the load process. Further, the RNMC 76 can be utilized to store software and firmware capable of operating or managing the storage device 66 and its subcomponents.

In general, the integrated manager 74 manages the configuration of the device 66 and monitors all activity performed by the device 66. The controller 82 controls the operation of the device 66 and in particular directs a movable cartridge access device 72 to retrieve requested cartridge(s) 65 from the storage element 68 and load the cartridge(s) 65 into the cartridge drive 70. The movable cartridge access device 72 can comprise robotic arms (not specifically shown) to retrieve a cartridge(s) 65 once it is in a location that enables the arms access to a requested cartridge 65.

The operation of the integrated manager 74 is preferably controlled via the manager logic 100, which may be implemented in hardware, software, or a combination thereof. The manager logic 100 may be configured to track and save, to the RNMC 76, operational information that can be used when system components are replaced or when revisions of system components are desirable. In addition, the manager logic 100 can track and save basic system data for operating or evaluating the storage device 66. Note that the communication interface 80 can include a parallel port (e.g., a small computer system interface (SCSI) port), a serial port (e.g., an RS-232C, Ethernet or an RS-422 port) or other type of known or future developed data communication port.

The host computer 60 of the embodiment of the storage system 58, shown in FIG. 1, preferably comprises a communication interface 64 and requesting logic 62. The requesting logic 62 may transmit a "load" request via communication interface 64, requesting that the storage device 66 provide access to a cartridge 65 indicated in the request. In addition, the requesting logic 62 may transmit a "unload" request requesting that the storage device 66 unload the data cartridge 65 and return the cartridge 65 to the storage element 68.

The controller 82 preferably receives the "load" and "unload" requests over connection 55 via communication interface 64. When a "load" or an "unload" request is received by the controller 82, logic in the controller 82 detects the request and responds by signaling the movable cartridge access device 72 to retrieve the requested cartridge 65 from either storage element 68 or cartridge drive 70, as the case may be. Preferably, the host computer 60 communicates with the cartridge drive 70 via connection 55. Communication between the host computer 60 and the cartridge drive 70 can be effectuated via a small computer system interface (SCSI) or some other known or future-developed protocol. Similarly, the integrated manager 74 may be coupled to the controller 82 by a communication bus and detects the move request and records information about the request and any events during the processing of that request.

In some embodiments, the communication interface 80 of the integrated manager 74 is coupled to the management interface 85 of the cartridge drive 70 by a suitable communication link. The communication interface 80 cooperates with the management interface 85 to monitor operations of the cartridge drive 70 via the communication link.

Figure 2:
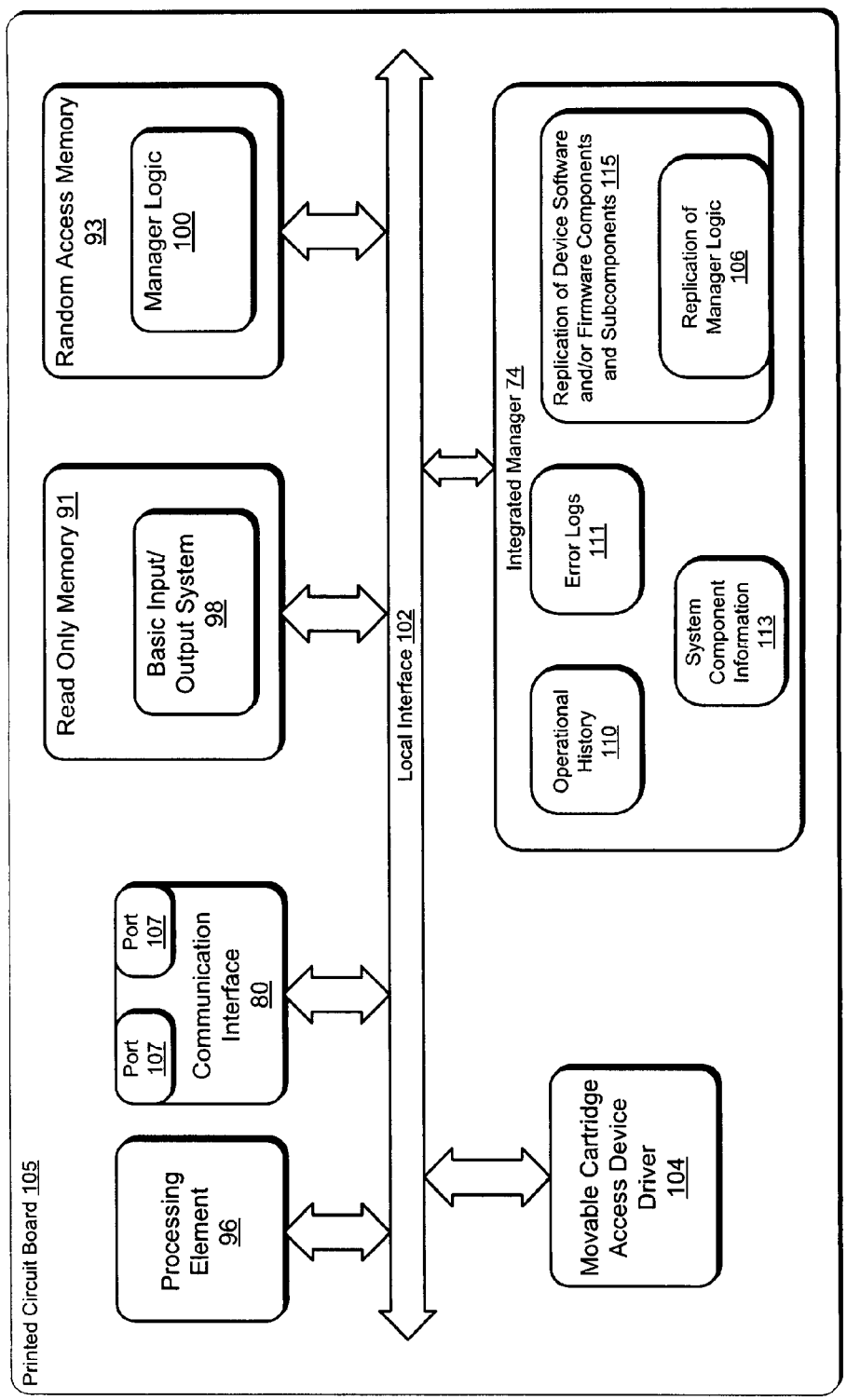
FIG. 2 is a block diagram illustrating an embodiment of an integrated manager, such as is shown in FIG. 1.

FIG. 2 depicts an exemplary embodiment of the integrated manager 74. The integrated manager 74 of FIG. 2 comprises read-only memory (ROM) 91 and random access memory (RAM) 93. The ROM 91 preferably stores a basic input/output system (BIOS) 98, which enables the manager 74 to become operable without accessing additional software or firmware. The operation and functionality of BIOS 98 is discussed further below. As illustrated by way of example in FIG. 2, the manager logic 100 is preferably implemented in software and stored in RAM 93. However, in other embodiments the logic 100 may be implemented in hardware or a combination of hardware and software, and/or the logic 100 may reside within data storage components other than RAM 93.

In some embodiments the integrated manager 74 may be implemented as an integral component of storage device 66. In other embodiments the integrated manager 74 may be integrated as a separate computing device which may be located remote from the storage device and connected to the storage device 66 via a communication network. Further, integrated manager 74 may be coupled to multiple storage devices 66 which may be co-located in a single facility or may be geographically remote.

The manager logic 100, when implemented in software, can be stored and transported on any computer-readable medium for use by or in connection with an instruction execution system, apparatus, or device, such as a computer-based system, processor-containing system, or other system that can fetch and execute instructions. In the context of this document, a computer-readable medium can be any means that can contain or store a program for use by or in connection with the instruction execution system, apparatus, or device. The computer-readable medium can be, for example but not limited to, an electronic, magnetic, optical, or semiconductor system apparatus or device. As an example, the manager logic 100 may be magnetically stored on a conventional portable computer diskette or other suitable portable memory.

As shown by FIG. 2, in some embodiments each of the components of the integrated manager 74 may reside on a single printed circuit board (PCB) 105. However, in other embodiments, the integrated manager 74 components may reside on multiple PCBs and/or be interconnected via other types of known or future-developed devices. The PCB 105 can interface with the storage device 66 via an expansion slot, as a daughterboard or as a controller board or via a communication link. Note that the RNMC 76 is preferably implemented as compact flash memory, and the socket 75 residing on the PCB 105 may comprise smart media card connectors, compact flash card connectors, secure digital card connectors, multi media card connectors, memory stick card connectors, or other known or future-developed chip interfaces that enable insertion and removal of the RNMC.

The embodiment of the integrated manager 74 depicted in FIG. 2 comprises one or more system processing elements 96, such as a digital signal processor (DSP) or a central processing unit (CPU), that communicate to and drive the other elements within the manager 74 via a local interface 102, which can include one or more buses. In addition, the manager 74 depicted in FIG. 2 may comprise a movable cartridge access device driver 104 that receives requests from manager logic 100 and communicates such requests with the controller 82 (FIG. 1). Note that the movable cartridge access device driver 104 can be implemented in software, hardware or a combination thereof.

RNMC 76 preferably stores operational data, including, but not limited to error logs 111, system component information 113, and copies of software and/or firmware for various components and/or sub-components of the system, for example a copy of the manager logic 106.

When an event such as, e.g., a read or write, load/unload, retry or error occurs during operation of the storage device 66, the management interface 85 in the cartridge drive 70 preferably detects the event and generates a signal in response to the event. In an alternate embodiment the manager logic 100 may monitor the cartridge drive 70 via the management interface 85 and discover the event. Further, the management interface 85 may send information about the event to the manager logic 100 which will write information about the event to the error logs 111 in the RNMC 76, textual or symbolic data indicative of the detected error. In addition, as normal operational events occur, for example when a cartridge is retrieved from the storage element 68 or the cartridge drive 70 or when a read or write begins to a cartridge loaded into the cartridge drive 70, the management interface may write, to the operational history 110, textual or symbolic data indicative of normal events that occur during operation.

Furthermore, the manager logic 100 may be configured to periodically perform tests on the cartridge drive 70 and store results of the tests in the RNMC 76. Similarly, the cartridge drive 70 may periodically perform a self test to determine if all components are functioning within tolerances. If the cartridge drive 70 performs a self test and discovers faulty or marginal component, then the management interface 85 may transmit to the manager logic 100 information about the fault. The manager logic 100 may download to the system component information 113 of the RNMC 76, data indicative of the fault. Note that the system component information 113 may also comprise serial numbers, warranty information, or maintenance information related various components of the RNMC.

The integrated manager 74 may use the data in the RNMC 76 to determine at what point during a process an error occurred. For example, the operational history 110 may indicate that a cartridge 65 was loaded into cartridge drive 70, but the error logs 111 may indicate that the cartridge 65 was not successfully threaded into the cartridge drive 70. Therefore, to initiate recovery, the manager logic 100 may retrieve the error log information representing the failed event and, based on this information determine that the first step in the recovery process is to remove the cartridge 65 from the cartridge drive 70 and repeat the load. Thereafter, the device 66 can operate as normal, waiting for a request for a cartridge 65.

Throughout the load and/or retrieval process, the management interface 85 preferably communicates with the manager logic 100 indicating successful completion of each read, write, or other significant event. Moreover, the manager logic 100 writes, to the operational history, data that indicates successful completion of each consecutive read, write, or other significant event. Therefore, when an error occurs in the read or write process, the operational history of the specific read or write process can be retrieved from the RNMC 76. The operational history 110 preferably indicates the last step in the process that completed successfully, and when the device 66 is recovering, the manager logic 100 may begin recovery at the point in the process that last successfully completed. Therefore, the manager logic 100 can use the operational data stored in the error logs 111 and the operational history 110 to reset the mechanical components, as is appropriate.

As indicated in FIG. 2, in addition to the operational history 110 and the error logs 111, the RNMC 76 can further store system component information 113. As described herein, system component information can comprise hardware type information, serial number data, and/or warranty data. For example, the system component information can include the serial number of the movable cartridge access device 72 and/or the cartridge drive 70. In another example, the system component information 113 may include warranty data indicative of the terms associated with the manufacturer's warranty of at least one component of the storage device 66. The system component information 113 may be loaded into the RNMC 76 at any time, including when the storage device 66 is manufactured and setup for operation. Thus, each hardware component implemented on the storage device 66 can be listed and described in the system component information 113.

In addition, the system component information 113 may comprise, for example, a serial number of the storage device 66. Such a number can be used for warranty purposes as a key, to ensure that the RNMC 76 is only used with the storage device 66 for which the RNMC is configured (e.g., to ensure that the serial number of the data storage device 66 corresponds to the serial number stored in the RNMC 76). For example, during manufacturing, the RNMC 76 may be programmed with the serial number of the storage device 66 in which it is being installed. As will be described in more detail hereafter, if the manager 74 malfunctions and is replaced, the RNMC 76 may be removed from the PCB 105 of the defective manager 74 and installed on a replacement PCB 105. The manager logic 100 can then retrieve the identification number of the storage device 66 from the RNMC 76, and compare the identification number with that of the data storage device serial number. If the retrieved numbers correspond (i.e., match), then the RNMC 76 has been inserted into the correct data storage device. If the numbers do not correspond, then the manager 74 generates a warning message or activates a warning indicator (not specifically shown). This process may prevent the misuse of an RNMC 76 in a data storage device 66 for which it is not designed to be used.

In addition to the serial number of the storage device 66, the system component information 113 can comprise the serial numbers of other hardware components, such as, for example, the data cartridge drive 70 (FIG. 1), the data cartridge array 68 (FIG. 1), and/or the communication interface 80 (FIG. 1). The manager logic 100 preferably tracks the hardware components and variables related to the components, for example, the date of installation, the time used, and/or the number of failures for a particular component. This information can be stored on the RNMC 76. Thus, throughout the life of the storage device 66, the foregoing information is available for use in various ways, including determining warranty information for malfunctioning parts that need to be replaced or serviced. As an example, warranty information regarding one of the device's components may be retrieved from the RNMC 76 and utilized by a manufacturer, retailer, or service technician of the one component in order to determine whether the one component is to be replaced or serviced at a reduced cost. In addition, the foregoing information may also be utilized to diagnose problems associated with the tracked components.

In addition to storing operational history 110, error logs 111 and system component information 113, the RNMC 76 can also store replications of software and/or firmware for system components 115. When the manager 74 malfunctions, the PCB 105 may be removed from the storage device 66, and the RNMC 76 may be detached from the removed PCB 105. A replacement PCB 105 may then be installed in the device 66 to replace the removed PCB 105. The RNMC 76 detached from the removed PCB 105 may then be interconnected with the socket 75 of the replacement PCB 105.

When power is provided to the storage device 66, the BIOS 98 executes at power-up. When the manager logic 100 is implemented in software, the logic 100 may be stored in the RNMC 76, and the BIOS 98 may be configured to retrieve the manager logic 100 from the RNMC 76 and write the manager logic 100 into RAM 93 at power-up. The manager logic 100 may then be executed by the processing element 96. In addition, other software and/or firmware that is stored on the RNMC 76 for operating other components of the storage device 66 can be loaded and executed, such as software for implementing the movable cartridge access device driver 104, for example.

As shown in FIG. 2, the communication interface 80 of the integrated manager 74 may comprise a plurality of ports 107. One of the ports 107 may be utilized to exchange data with the host computer 60. The other port 107 may be used to access information related to the cartridge drive 70. For example, a laptop computer (not specifically shown) or some other data communication device may be connected to one of the ports 107. This laptop computer may be configured with a utility or a graphical user interface (GUI) that enables a user of the laptop to access the data stored on the RNMC 76. In particular, a user could copy software and/or firmware revisions for the hardware components of the storage device 66 to the RNMC 76, thereby non-invasively updating the software and/or firmware. Note that software and/or firmware upgrades could also be performed by removing the RNMC 76 from the manager 74, copying software and/or firmware upgrades to the RNMC 76 while the RNMC 76 is detached from the manager 74, and reinserting the RNMC 76 into the manager 74 for reprogramming by the BIOS of the manager logic 100.

The ports 107 can be configured to communicate via RS-232, RS-422, small computer standard interface (SCSI), or any other known or future-developed protocols.

Figure 3:
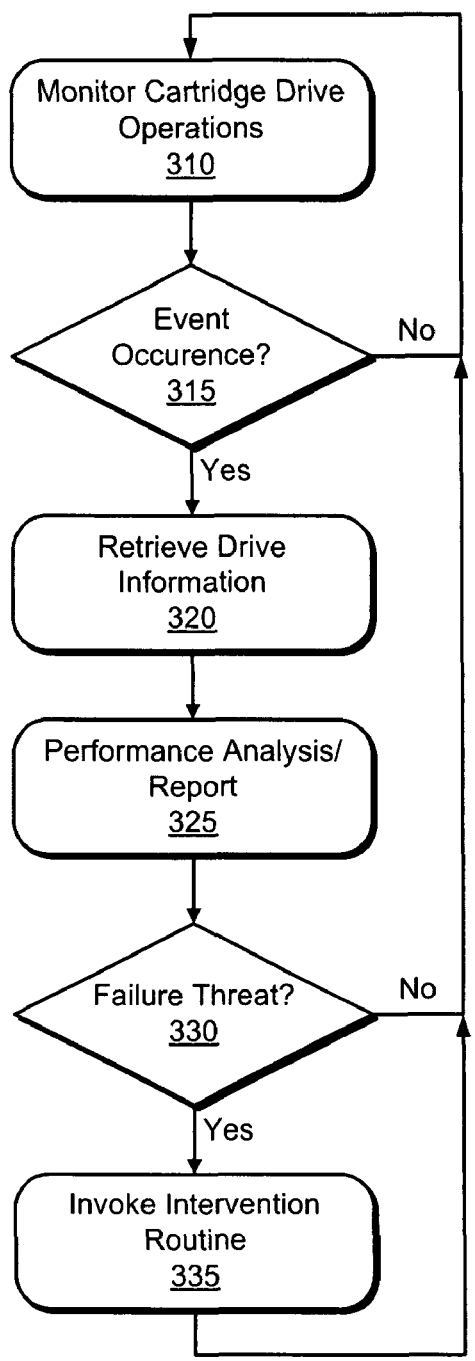
FIG. 3 is a flowchart illustrating operations in an exemplary embodiment of a method for cartridge drive diagnostics.

Operations for cartridge drive diagnostic tools will be explained with reference to FIG. 3. FIG. 3 is a flowchart illustrating operations in an exemplary embodiment of a method for cartridge drive diagnostics. Referring to FIG. 3, at operation 310 operations of the cartridge drive 70 are monitored. For example, the manager logic 100 may monitor operations of cartridge drive 70 via the management interface 85. In some embodiments the manager logic 100 monitors the cartridge drive 70 for specific events such as, e.g., unload requests from a host, read or write errors in the cartridge drive 70, or load requests from a host, and the like.

If, at operation 315, no specified events are detected, then control passes to back to operation 310 and the monitoring continues. By contrast, if at operation 315 an event is detected, then control passes to operation 320.

At operation 320 drive information is retrieved. In some embodiments the manager logic 100 retrieves drive information from the management interface 85 of the cartridge drive 70. For example, in some embodiments the manager logic 100 retrieves event logs maintained by cartridge drive 70. In addition, manager logic 100 retrieves data about the current operating status of the cartridge drive 70. For example, manager logic 100 may retrieve information such as a temperature reading near the drive, whether the drive is full or empty, or the like.

At operation 325 the manager logic 100 initiates a performance analysis using the drive information collected in operation 320. In some embodiments the performance analysis may include analyzing historical information from event logs. For example, the event log may be analyzed for event patterns such as a number or frequency of events that have resulted in drive failures. In some embodiments the performance analysis may include comparing drive information retrieved in operation 320 to operational specifications for the drive, which may be stored in a suitable memory location. For example, the drive temperature retrieved in operation 320 may be compared to a safe operational temperature threshold for the drive. In other embodiments the performance analysis may include analysis of information the cartridge drive has collected about the cartridges that have been used in the drive to detect faulty cartridges. The performance analysis process may generate one or more reports, which may be stored in memory or presented via a user interface.

If, as a result of the performance analysis, at operation 330 it is determined that the event occurrence detected in operation 315 does not present a failure threat, then control passes back to operation 310 and the manager logic 100 continues to monitor operations of the cartridge drive 70. By contrast, if the event occurrence detected in operation 315 presents a failure threat, then control passes to operation 335 and manager logic 100 invokes an intervention routine. In some embodiments the intervention routine may comprise generating a warning message for display on a user interface, initiating a back-up routine to copy data on a cartridge in the cartridge drive, exporting a faulty cartridge 65, and/or removing power to the cartridge drive.

The operations of FIG. 3 permit the integrated manager 74 to monitor operations of a cartridge drive 70 and to anticipate potential failure events of cartridge drive 70. Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method for use in a cartridge storage system, comprising:
   detecting an occurrence of a defined event in a cartridge drive in the cartridge storage system;
   storing information regarding operation of the cartridge drive, wherein the information includes an indication that a storage cartridge is loaded in the cartridge drive;
   in response to the defined event, initiating an analysis of information regarding the defined event from the cartridge drive;
   invoking an intervention routine when the analysis indicates that the defined event represents a failure threat, wherein the intervention routine causes an action to be performed with respect to the failure threat;
   storing information regarding the failure threat in a removable nonvolatile memory that is removably mounted in the cartridge storage system, wherein the removable nonvolatile memory further stores one or more of software and firmware that operate components in the cartridge storage system; and
   in response to the analysis indicating that the defined event represents the failure threat, determining, based on the failure threat and the indication that the storage cartridge is located in the cartridge drive, that re-loading of the storage cartridge in the cartridge drive should be performed to address the failure threat.

2. The method of claim 1, wherein detecting the occurrence of the defined event in the cartridge drive comprises
   monitoring input/output operations directed at the cartridge drive in the cartridge storage system; and
   detecting at least one of:
      an unload request from a host;
      a read error;
      a write error; or
      a load request from the host.

3. The method of claim 1, wherein initiating the analysis of the information regarding the defined event from the cartridge drive comprises retrieving an event log from a memory module associated with the cartridge drive in the cartridge storage system.

4. The method of claim 1, wherein the analysis comprises:
   computing an event count for the defined event; and
   comparing the event count to a threshold.

5. The method of claim 1, wherein the action performed by the intervention routine comprises generating a warning message for display on a user interface.

6. The method of claim 1, wherein the action performed by the intervention routine comprises initiating a back-up routine to copy data on a cartridge in the cartridge storage system.

7. The method of claim 1, wherein the action performed by the intervention routine comprises removing power to the cartridge drive in the cartridge storage system.

8. The method of claim 1, further comprising executing, in the cartridge storage system, the one or more of the software and firmware from the removable nonvolatile memory.

9. The method of claim 8, wherein the one or more of the software and firmware include monitoring logic to perform the detecting, the initiating, the invoking, and the storing.

10. The method of claim 9, wherein the one or more of the software and firmware further include other software or firmware to operate the components of the cartridge storage system.

11. The method of claim 8, wherein the executing is performed after:
    removing, in response to the failure threat, the removable nonvolatile memory from a first circuit board in the cartridge storage system, and subsequently mounting the removable nonvolatile memory on a second circuit board that replaces the first circuit board.

12. The method of claim 1, further comprising storing, in the removable nonvolatile memory, information regarding a position of a movable mechanical component at a point of failure.

13. A storage library, comprising:
    a library controller comprising first logic to manage input/output operations from a host computer;
    a removable nonvolatile memory removably mounted in the storage library, wherein the removable nonvolatile memory stores one or more of software and firmware that operate components in the storage library;
    at least one cartridge drive comprising a management interface to:
       detect an occurrence of a defined event in the cartridge drive;
       generate a signal in response to the defined event;
    an integrated manager comprising second logic to:
       receive the signal from the management interface;
       store information regarding operation of the cartridge drive, wherein the information includes an indication that a storage cartridge is loaded in the cartridge drive;
       in response to the defined event indicated by the signal, initiate an analysis of information regarding the defined event from the cartridge drive; and
       invoke an intervention routine when the analysis indicates that the defined event represents a failure threat, wherein the intervention routine causes an action to be performed with respect to the failure threat;
       store information regarding the failure threat in the removable nonvolatile memory; and
       in response to the analysis indicating that the defined event represents the failure threat, determine, based on the failure threat and the indication that the storage cartridge is located in the cartridge drive, that re-loading of the storage cartridge in the cartridge drive should be performed to address the failure threat.

14. The storage library of claim 13, wherein the defined event is selected from among:
    an unload request from a host;
    a read error;
    a write error; or
    a load request from the host.

15. The storage library of claim 13, wherein the second logic in the integrated manager is configured to, in response to the failure threat, initiate a back-up routine to copy data on a cartridge in the cartridge drive.

16. The storage library of claim 13, wherein the second logic in the integrated manager is configured to, in response to the failure threat, remove power to the cartridge drive.

17. The storage library of claim 13, further comprising a first circuit board having a socket in which the removable nonvolatile memory is removably mounted, wherein the removable nonvolatile memory is mountable in a replacement circuit board to replace the first circuit board in response to the failure threat.

18. The storage library of claim 17, further comprising logic to execute the one or more of the software and firmware from the removable nonvolatile memory.

19. A computer program product comprising logic instructions stored in a non-transitory computer readable storage medium which, when executed on a processor, configure the processor to:

detect an occurrence of a defined event in a cartridge drive;

store information regarding operation of the cartridge drive, wherein the information includes an indication that a storage cartridge is loaded in the cartridge drive;

in response to the defined event, initiate an analysis of information regarding the defined event from the cartridge drive; and in response to the analysis indicating that the defined event represents a failure threat, determine, based on the failure threat and the indication that the storage cartridge is located in the cartridge drive, that re-loading of the storage cartridge in the cartridge drive should be performed to address the failure threat.

20. The computer program product of claim 19, wherein the failure threat indicates that the storage cartridge was not successfully threaded in the cartridge drive.

* * * * *